United States Patent
Dushey et al.

(10) Patent No.: US 11,779,031 B2
(45) Date of Patent: Oct. 10, 2023

(54) METHOD FOR PRODUCING CRUNCH/CRISP FROZEN DESSERT CONFECTION

(71) Applicants: Ronald Dushey, Brooklyn, NY (US); Renee Dushey, Brooklyn, NY (US)

(72) Inventors: Ronald Dushey, Brooklyn, NY (US); Renee Dushey, Brooklyn, NY (US)

( * ) Notice: Subject to any disclaimer, the term of this patent is extended or adjusted under 35 U.S.C. 154(b) by 286 days.

(21) Appl. No.: 16/181,267

(22) Filed: Nov. 5, 2018

(65) Prior Publication Data

US 2019/0150472 A1     May 23, 2019

Related U.S. Application Data

(60) Provisional application No. 62/581,131, filed on Nov. 3, 2017.

(51) Int. Cl.

| | |
|---|---|
| *A23G 9/32* | (2006.01) |
| *A23G 9/24* | (2006.01) |
| *A23G 9/48* | (2006.01) |
| *A23G 3/34* | (2006.01) |
| *A23G 3/54* | (2006.01) |

(52) U.S. Cl.
CPC ............ *A23G 9/322* (2013.01); *A23G 3/007* (2013.01); *A23G 3/343* (2013.01); *A23G 3/545* (2013.01); *A23G 9/24* (2013.01); *A23G 9/48* (2013.01); *A23G 2200/08* (2013.01); *A23G 2200/14* (2013.01); *A23G 2220/20* (2013.01)

(58) Field of Classification Search
None
See application file for complete search history.

(56) References Cited

U.S. PATENT DOCUMENTS

2004/0137123 A1*   7/2004   Mansuino ............ A21C 11/006
                                                                          426/496

OTHER PUBLICATIONS

Annie "Rice Krispy Treat Easter Eggs" by AniesChamorroKitcheen Mar. 29, 2015 pp. 1-4 https://www.annieschamorrokitchen.com/rice-krispy-treat-easter-eggs/ (Year: 2015).*
Hogan, Ron "Frozen Rice Krispy Treats stuffed with Ice Cream" Aug. 2010, pp. 1-7 http://www.popfi.com/2010/08/19/frozen-rice-krispy-treats-stuffed-with-ice-cream/ (Year: 2010).*
The Accidental Scientist "Monster Mallows" pp. 1-2, Aug. 28, 2016 https://www.exploratorium.edu/cooking/candy/activity-mallows.html (Year: 2016).*
Arbuckle et al Ice Cream, 2nd Edition, The AVI Publishing Company 1972, p. 270 (Year: 1972).*

* cited by examiner

*Primary Examiner* — Jyoti Chawla
(74) *Attorney, Agent, or Firm* — Israel Nissenbaum; Yitzy Nissenbaum

(57) ABSTRACT

A method for making dessert confections within a crunch/crisp encasement comprising the steps of: preparing a mixture of crunch/crisp material with an edible binder; placing a first portion of the mixture into a first open mold to form a first structure; forming a retention cavity in the first structure; placing a second portion of the mixture of crunch/crisp material with edible binder into a second open mold to form a second structure; allowing the first and second mixture structures in the first and second molds to harden; removing the first and second mixture structures from the respective first and second molds; placing a structurally self-supporting filler dessert material into one or both of the retention cavities of the first and second mixture structures; and connecting the first and second mixture structures, to form an enclosure comprised of the crisp/crunch material with binder and filler dessert material in a hollow therein.

4 Claims, 3 Drawing Sheets

METHOD FOR PRODUCING CRUNCH/CRISP FROZEN DESSERT CONFECTION

FIELD OF THE INVENTION

This invention relates to dessert crunch/crisp (crisp/crunch and crunch/crisp are interchangeably used herein) production and relates particularly to ice cream or frozen yogurt encased, rather than coated, in a crunch or crisp shell or casing.

BACKGROUND

Ice cream and frozen yogurt are often available with crisp or crunch coating of various types such as chocolate sprinkles, crisped rice, nut pieces (particularly almonds), and the like. Other confection materials, often of a dairy nature, such as soft ice cream and the like are similarly treated with various flavoring coatings. These confections are normally prepared with, for example the ice cream or frozen yogurt being dipped into the crisp or crunch composition, with the latter adhering to the ice cream or frozen yogurt. Alternatively crisp or crunch compositions such as "sprinkles" are sprinkled on the confections such as ice cream. Dipped ice cream, with coating are normally available in bar type configuration while ice cream with sprinkles is often available in container held ice cream such as on scoops in cones or in paper cups.

In substantially all of such varieties, the crisp or crunch on the ices cream or other confection material is only in the form of a thin layer directly adjacent the ice cream surface and adhered thereto. As used herein, crunch or crisp materials comprise small bits of solid materials which are not liquefied or powdered. The crunch or crisp material is not amenable to the small bits being adhered to each other, thereby inevitably providing only a thin, one layer thick, crisp or crunch coating. Crisp or crunch materials, by their very nature are not sticky enough to provide any adhesion between the small bits to enable the build up of several layers or a thicker crisp or crunch coating.

Examples of crunch/crisp materials include coconut flakes, nut bits, chocolate bits, toasted crisped rice and the like. Honey coated particles or bits may promote adhesion but, at the same time, retard material flow and full and proper coating. The term "ice cream" includes frozen dessert materials such as ice cream, frozen yogurt, frozen tofu, gelato and the like.

Liquid or viscous food materials are generally considered not to be amenable to being coated except as an unstable admixture or as a standard coating of the viscous material, such as yogurt, similar to that of ice cream, as described.

Processes, such as used with the filling of chocolates by using chocolate molds are not applicable to similar handling of crunch or crisp materials, which are not of a flowable liquid consistency. In addition, the bits of crunch or crisp materials are not amenable to the formation of a homogenous solid structure, as with a filled chocolate, without loss of the desired crunch or crisp consistency. Furthermore, liquid chocolate is perforce heated to assume a liquid form and this is not compatible with cold materials such as frozen ice cream.

SUMMARY OF THE INVENTION

It is an object of the invention to provide a method for the production of an ice cream or other frozen dessert confection enclosed in a substantially solid edible encasement comprised of a crisp or crunch material and an edible binder.

It is a further object of the invention to provide a method for the production of a liquid or flowable viscous edible material such as yogurt and the like both encapsulated and further enclosed within the solid edible encasement comprised of the crisp or crunch material.

Generally the present invention comprises, in one embodiment, a method for making a dessert confection within a crunch/crisp encasement and the confection so made. The method comprises the steps of:

a) Preparing a mixture of crunch/crisp material with an edible binder to form a solid impressionable material;
b) Placing a first portion of the solid impressionable mixture of crunch/crisp material with binder into a first open mold to form a first molded crisp/crunch impressionable mixture structure;
c) Forming a retention cavity in the first solid impressionable mixture;
d) Placing a second portion of the solid impressionable mixture of crunch/crisp material with edible binder into a second open mold to form a second molded crisp/crunch impressionable mixture structure;
e) If necessary, allowing the first and second mixture structures s in the first and second molds to harden;
f) Removing the first and second mixture structures from the respective first and second molds
g) Placing a structurally self-supporting filler dessert material into one or both of the retention cavities of the first and second mixture structures; and
h) Connecting the first and second mixture structures, with contained filler dessert confection material to form an enclosure comprised of the crisp/crunch material with binder and filler dessert material in a hollow therein.

The above object and other objects, features and advantages of the invention will be more evident from the following discussion and drawings in which:

SHORT DESCRIPTION OF THE DRAWINGS

DETAILED DESCRIPTION OF THE INVENTION AND DRAWINGS

Figure 1:
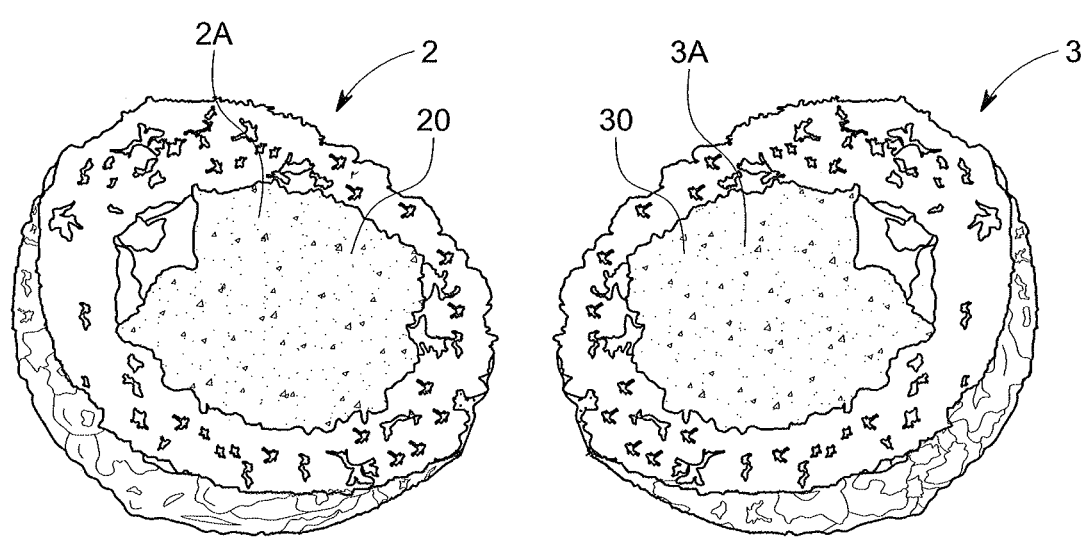
FIG. 1 shows ice cream contained in two half shells of molded toasted crisped rice.

In an embodiment, the mixture of crunch/crisp material is prepared with an edible binder such as melted marshmallow; agar agar; carrageenan; xantham gum; and the like in binding form. The binder being present in sufficient amounts to enable the crunch/crisp material to be formed into a viscous self-supporting molded structure but not in excessive amount which detract from the crisp/crunch flavor characteristics or too solid for placement into a mold. Alternatively, the binder may be admixed with the crisp/crunch material in situ within the respective molds. A typical binder and crisp/crunch ratio is 5.5 cups of toasted rice cereal (Rice Krispies®) melted with 10 ounces of marshmallow and a tsp. of margarine.

The mixture of crunch/crisp material with binder is placed or poured into two open molds (if not made in situ) such as with two hemispherical mold configurations to form a sphere together (it is understood that a spherical shape is not required and that other, three dimensional shapes are similarly operable) to form a soft solid but impressionable molded structure The solid impressionable mixture containing crunch/crisp material with binder, is formed with a retention cavity or is otherwise formed with an indentation or hollow with the indentation retaining its shape. In an embodiment, a smaller mold is used on an obverse side to make the indentation cavity (as with the exterior shape, the configuration of the indentation may vary and includes any fillable shape);

Optionally either or both of the first and second molds or molded structures are heated to facilitate hardening of the mixtures;

The frozen dessert material, may be pre-shaped, such as ice cream balls and placed into the separate indentation cavities of the mixtures in the first and second mold (after mold cooling if heated). Alternatively, with a structurally hard, self sustaining dessert material, it may be placed into one indentation cavity of one of the molded mixtures in either first and second molds and extend out therefrom to subsequently fill the other of the indentation cavities as well.

After the dessert material is placed into one or both of the mold mixtures the open ends of the molded mixtures of the first and second molds are sealed or attached together at their open edges with the frozen dessert being thereby encasing the dessert material within an enclosure comprised of the crunch/crisp material, as a total dessert confection. The size of the confection generally ranges from about 1 inch in diameter to about 3 inches, accordingly to readily handles standard dessert confection sizes and is dependent on the strength and thickness of the shell crisp/crunch coating encasement.

Where there is an extending portion of the dessert material it should ideally not be larger than the indentation of the other indented molded material to avoid dessert material being squeezed out between the sealed together molded materials. Connection of the first and second molds is, in different embodiments, effected with adhesive quality of the binder material such as marshmallows or, in another embodiment, by shaping the mold edges with complementary inter-fitting beveled exposed ends. With this latter embodiment a frictional fitting between the beveled edges maintains the spherical or other enclosure structure.

To effectively encapsulate a liquid or otherwise viscous material, such as yogurt or soft ice cream it is a further embodiment of the present invention to utilize a process such as a spherification whereby the liquid or viscous food material is encased, albeit with a fragile casing, sufficiently for it to be handled and emplaced in the molded mixture. An effective encapsulation is prepared with the known utilization of a reaction of sodium alginate, an algae extract used as a food stabilizer.

There is a reaction between sodium alginate, and the calcium in a dairy product, which causes the dairy product to gel. Accordingly, by adding the sodium alginate to a calcium rich food to be encapsulated a spherical gel results. Alternatively, the calcium-rich food may be dipped into a solution of sodium alginate, with gelation stopping with removal of the food from the sodium alginate solution.

Figure 2:
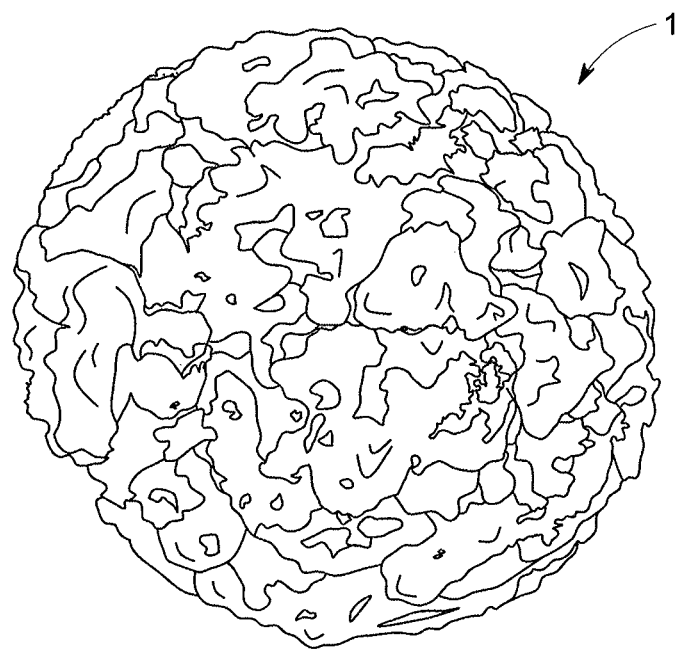
FIG. 2 shows the half shells of FIG. 1 being adhering compressed to form a confectionary ball with a central ice cream core.

With reference to the drawings, FIG. 1 depicts the initial halves 2 and 3 of a crunch/crisp dessert ball 1 of FIG. 2 with ice cream 2a contained within half 2 and ice cream 3a contained within half 3. The two halves are formed in spherical molds (not shown) and removed therefrom and indented to provide hollows 20 and 30 for placement of the ice cream 2a and 3a therein.

Figure 3:
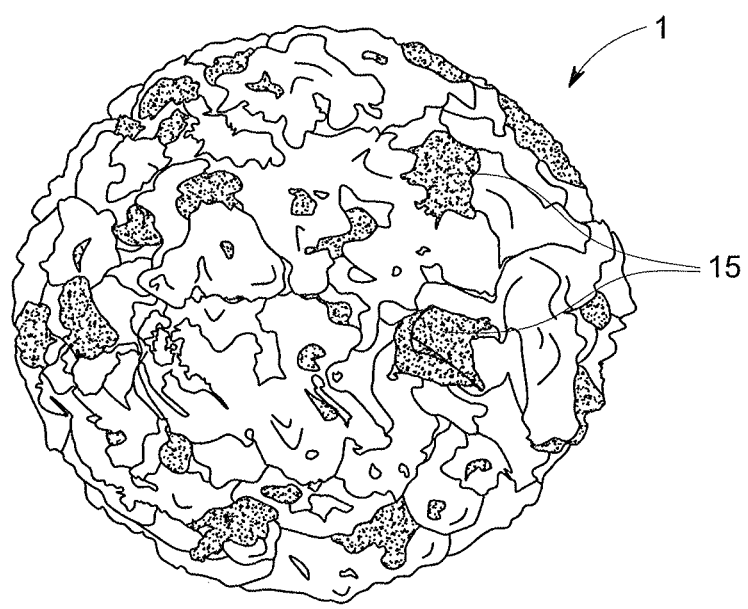
FIG. 3 show the confectionary ball of FIG. 2 having further embedded dried fruit pieces on its outer surface.
Figure 4:
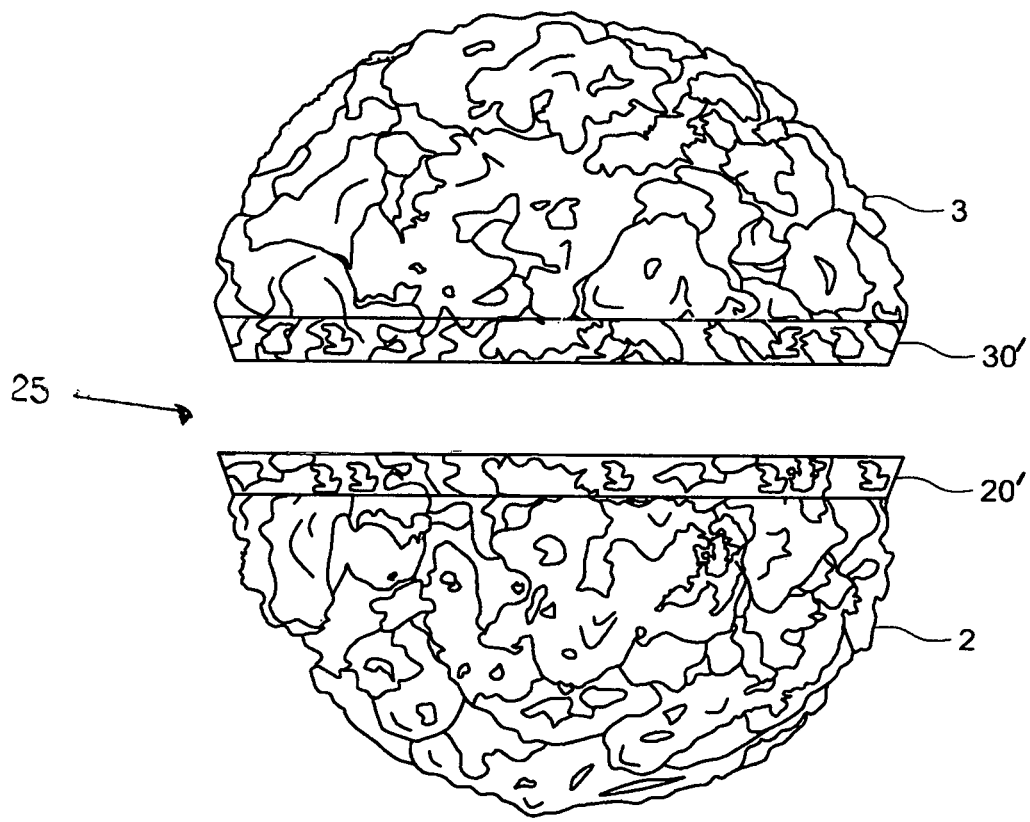
FIG. 4 is a partial cross section of inter-fitting bevels of the first and second mold which form corresponding molded materials.

The two halves 2 and 3 are brought together with a beveled end attachment connection 25 shown schematically in FIG. 4 with the half 2 having beveled end 20', formed in the mold and half 3 having cofitting beveled end 30' formed in the mold for half 3. FIG. 3 shows the confection dessert ball 1 with imbedded raisin bits 15 which can be included at any time of the dessert ball production.

It is understood that the figures and examples are merely illustrative of the invention and that structure and component materials of the dessert confection can vary without departing from the scope of the invention as set fort in the following claims.

What is claimed is:

1. A method for making a frozen dessert confection comprised of a filler dessert material selected from the group consisting of ice cream, frozen yoghurt, frozen tofu, and gelato within a structurally self supporting encasement comprised of an edible ice cream crunch/crisp coating material, comprising the steps of:
   i. providing crunch/crisp material with an edible binder in sufficient amounts to form the crunch/crisp material into a unitary impressionable material;
   ii. placing a first portion of the impressionable material into a first open mold to form a first solid molded impressionable material structure;
   iii. forming a retention cavity in the first solid impressionable material structure with a press mold impression;
   iv. placing a second portion of the impressionable material into a second open mold to form a second solid molded impressionable material structure and
   v. forming a retention cavity in the second solid impressionable material structure with a press mold impression;
   vi. allowing the first and second solid impressionable material structures in the first and second molds to harden to form structurally self supporting encasement elements with the edible binder being sufficient to bind the crunch/crisp material into a hardened self supporting encasement structure;
   vii. removing the first and second material structures from the respective first and second molds;
   viii. placing a structurally self-supporting filler dessert material selected from ice cream, frozen yoghurt, frozen tofu and gelato as a solid into one or both of the retention cavities of the first and second mixture structures in a volume whereby the placed self-supporting filler material is sufficient to substantially fill both retention cavities, with pressed placement therein, and with the hardened self supporting edible encasement maintaining its shape and structure with such substantial filling and pressed placement; and
   ix. connecting the first and second material structures, with contained filler dessert material to form an enclosure comprised of the crisp/crunch material, with edible binder and filler dessert material filling a hollow therein, as a structurally self supporting encasement for the contained filler dessert material.

2. The method of claim 1 wherein the first and second molds are comprised of the ice cream crunch/crisp coating material and edible binder and configured to form the first and second impressionable material self supporting structures capable of being formed with interfitting bevels whereby the first and second mixture self supporting structures are able to be press fit to connect the first and second material self supporting structures and sealed together with the edible binder as adhesive to form the edible coating encasement as a structurally self supporting encasement for the filler dessert material.

3. The method of claim 1 wherein the edible binder is selected from the group consisting of melted marshmallow; agar agar; carrageenan; and xantham gum.

4. The method of claim 1 wherein the ice cream crunch/crisp coating material is selected from the group consisting of chocolate sprinkles, crisped rice, and nut pieces.

* * * * *